Dec. 28, 1943.　　　　I. H. LARSON　　　　2,337,668
TWO-CYCLE ENGINE
Filed Oct. 1, 1942　　　　2 Sheets-Sheet 1

INVENTOR
IVAN H. LARSON
BY
Ridsdale Ellis
his ATTORNEY

Dec. 28, 1943.  I. H. LARSON  2,337,668
TWO-CYCLE ENGINE
Filed Oct. 1, 1942  2 Sheets—Sheet 2
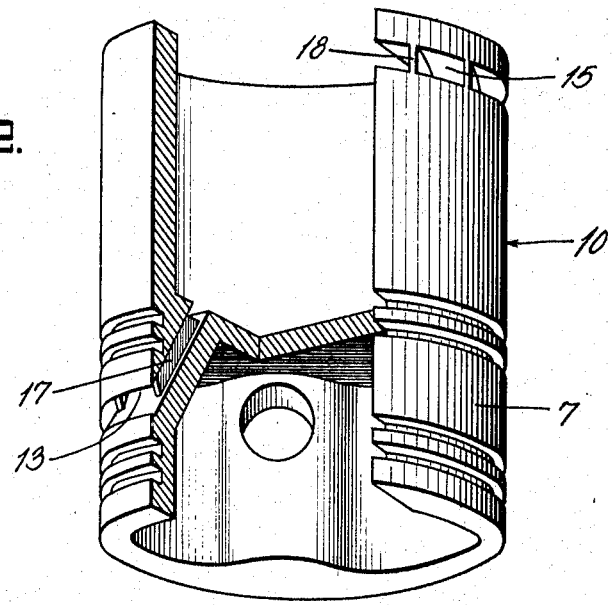
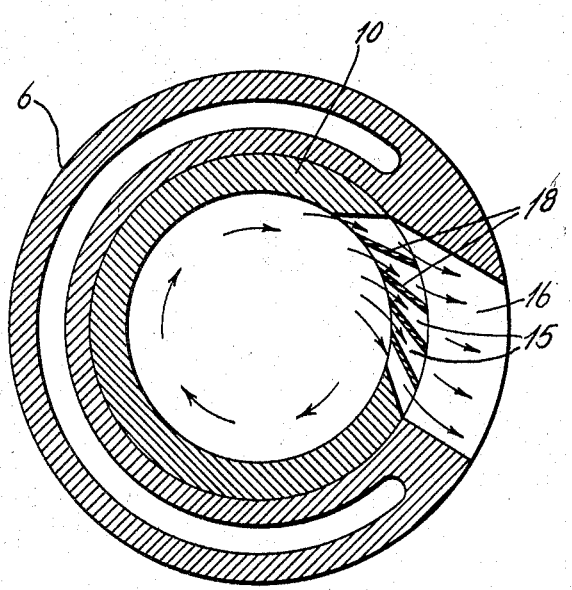
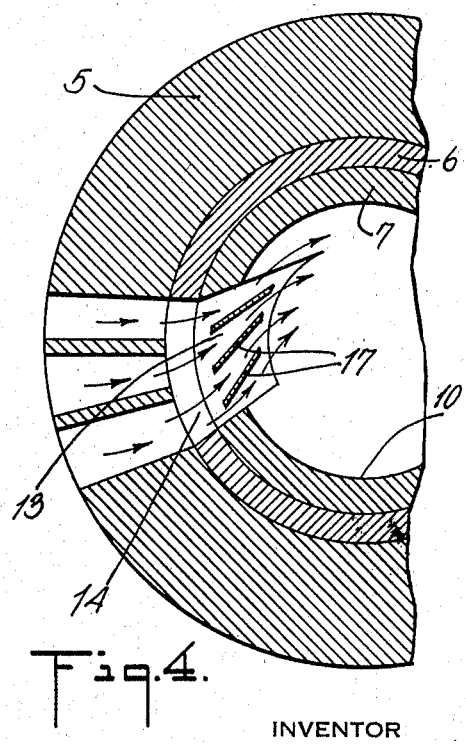
INVENTOR
IVAN H. LARSON
BY
Ridsdale Ellis
his ATTORNEY Patented Dec. 28, 1943

2,337,668

UNITED STATES PATENT OFFICE 2,337,668

TWO-CYCLE ENGINE

Ivan H. Larson, New York, N. Y.

Application October 1, 1942, Serial No. 460,455

4 Claims. (Cl. 123—65)

This invention relates to two-cycle engines.

Such engines are notoriously inefficient so far as the replacement of the products of combustion by a fresh charge is concerned. This largely due to the fact that the explosive mixture is introduced into the combustion chamber simultaneously with the exhaust of the burnt gases. The usual construction involves providing the cylinder with inlet and exhaust parts on opposite sides of the cylinder which are uncovered simultaneously by the piston as it moves toward the end of the explosion stroke. To some extent the by-passing of the fresh gases from the inlet to the exhaust parts may be eliminated by placing a deflector on top of the piston to direct the incoming gases toward the top of the cylinder. Better scavenging is obtained by providing an exhaust valve at the top of the cylinder. It has been proposed to use a poppet valve for that purpose. Poppet valves, however, require cams, rocker arms and other moving parts; the elimination of which is one of the main reasons for using a two-cycle instead of four-cycle engines.

One of the principal objects of the present invention, therefore, is to provide means for obtaining the advantages of exhausting the products of combustion from the top of the explosion chamber with a minimum of added parts.

This is accomplished by means of a special type of sleeve valve carried by and usually made integral with the piston, so that no separate or additional actuating parts are required. The use of a sleeve valve enables the inlet port to be located at the top of the combustion chamber and the exhaust at the bottom, but the reverse arrangement is the one preferred.

A further object of the invention is to improve the scavenging action by giving both incoming charge and waste products of combustion a rotary motion.

This result is attained by introducing the new charge more or less tangentially as well as upwards. The exhaust ports in the sleeve are arranged obliquely so that the rotating gases in the combustion chamber pass out with as little change in direction as possible.

An additional object of the invention is the production of an engine in which the charge is fired at or near that part of the combustion chamber which is least apt to be contaminated by waste products of combustion.

This is accomplished by placing the spark plug in an aperture in the side of the cylinder vertically over the inlet port at a distance substantially equal to the stroke of the piston. With such arrangement, at the top of the stroke the spark plug has substantially the same relative position with respect to the piston that the inlet port had at the bottom of the stroke. The proportion of products of combustion mixed with the new charge will be a minimum above the piston at the point which first registers with the inlet port and then with the spark plug. Hence, the likelihood of missing is reduced to a minimum.

One suitable form of construction is illustrated, by way of example, in the accompanying drawings, wherein:

Fig. 2 is a perspective view of the piston and its attached sleeve;

Fig. 3 is a section on the line 3—3 of Fig. 1; and

Fig. 4 is a section on the line 4—4 of Fig. 1.

Figure 1:
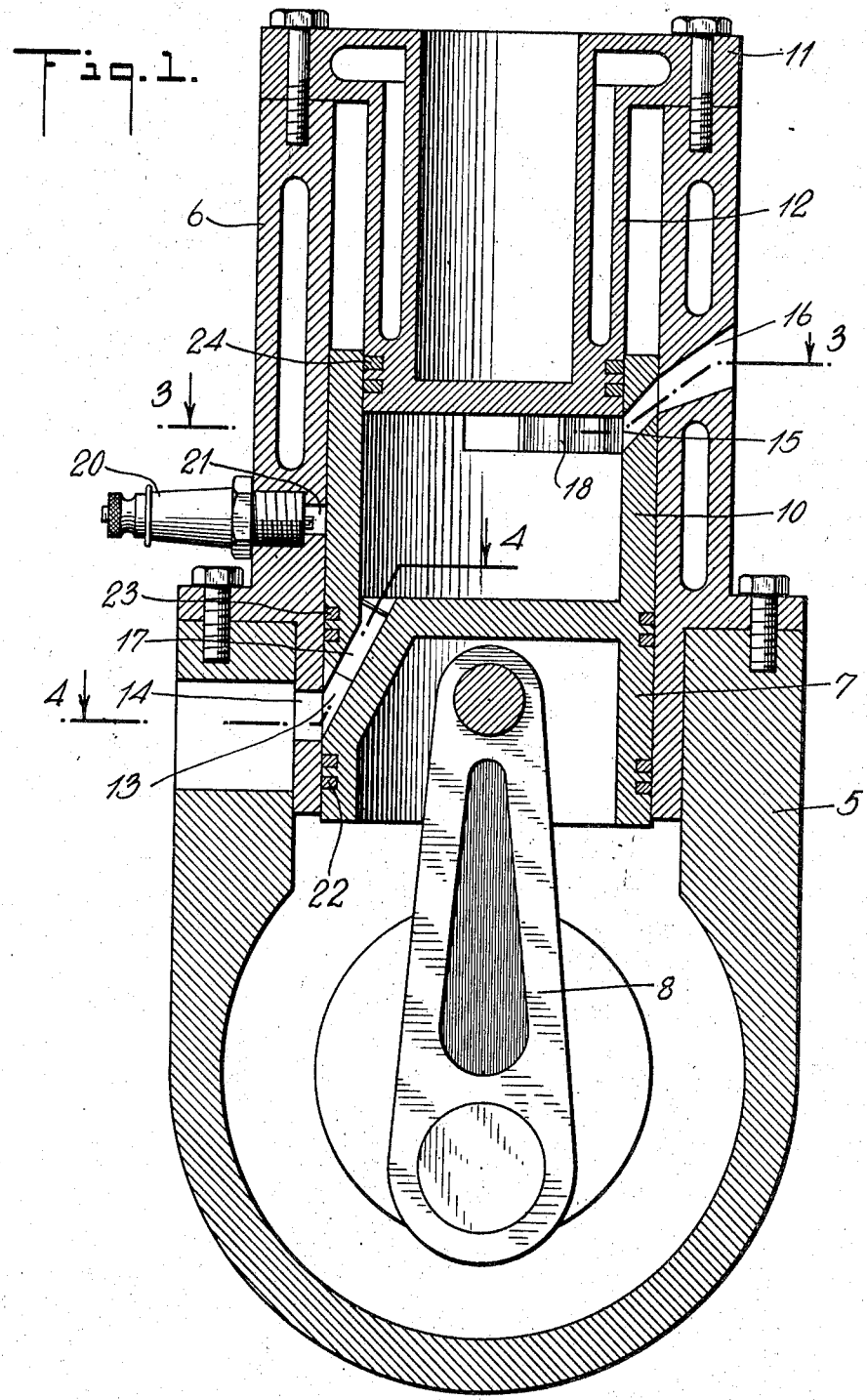
Fig. 1 is a vertical central section through an engine embodying my improvements.

The engine shown comprises a crank case 5, cylinder 6, piston 7 and connecting rod 8. Extending upwardly from the top of the piston is a sleeve 10. The cylinder is elongated to accommodate the additional length of the piston due to the sleeve extension. The cylinder head 11 instead of being flat, is provided with a downwardly extending center portion 12, the outside of which has a sliding engagement with the interior of the sleeve. This upward extension of the cylinder and the downward extension of the central part of the cylinder head form an annular recess for the reception of the sleeve.

The piston is provided with an inlet port 13 located so as to register with a port 14 in the cylinder when the piston is at the bottom of its stroke. In the sleeve an exhaust port 15 is located at the opposite side of the piston to the inlet port 13. This exhaust port registers with a port 16 in the cylinder at the same time that the ports 13 and 14 are in register. An explosive mixture is supplied to the port 14 either from the crank-case, as in common two-cycle practice, or from a super-charger. As the means by which the explosive mixture is supplied forms no part of the invention it is not illustrated in the drawings. The inlet port 13 is inclined upwardly while the exhaust port 15 is inclined upwardly and outwardly to aid the flow of gases through the combustion chamber from its lower to its upper corner.

To give the incoming charge a circular motion the inlet port 13 is formed, not only with side walls arranged obliquely or partly tangentially with respect to the periphery of the piston, but also with a series of similarly inclined partitions 17.

To aid the rotating products of combustion to escape the exhaust port 15 is likewise obliquely formed and also provided with inclined partitions 18.

As shown, the port 13 has considerable volume, so that; to secure the proper compression the top of the piston must nearly touch the bottom of the cylinder head extension 12 at the end of the compression stroke. With the major part of the compressed charge located in the inlet port 13, such port may, to advantage, be fired first by means of spark plug 20 located in an aperture 21 in the side of the cylinder. This aperture is located vertically above the port 14 at a distance substantially equal to the stroke of the piston. With such spacing, the spark plug is opposite the port 13 when the piston is at the top of its stroke. The gases in the lower part of the port 13 at the end of the compression stroke are less contaminated with products of combustion than those in any other part of the cylinder, so that the danger of missing is reduced to a minimum. This feature of the invention is applicable to the ordinary type of two-cycle engine and is not restricted to the present sleeve-valve form.

As shown, three sets of rings, 22, 23, and 24, are used. When the piston is at the top of its stroke and the charge is fired, the rings 22 are above the port 14, so that the passage of gases through port 13 downwardly along the wall of the piston to the port 14 is prevented. The rings 23 prevent escape of gases from the port 13 upwardly along the wall of the piston into the annular recess which receives the sleeve. When the charge is fired the port 15 is above the rings 24, so that gases cannot pass between the exterior of the extension 12 and the interior of the sleeve 10.

I claim:

1. A two-cycle engine comprising a cylinder and cylinder head, a piston therein, said piston having attached thereto a sleeve extending upwardly therefrom, said cylinder having an upstanding extension and said cylinder head having a downwardly extending central portion, the space between said extension and said portion forming an annular recess adapted slidingly to receive said sleeve, both the cylinder and the piston-sleeve combination having inlet and exhaust ports extending transversely therethrough, the inlet port in said combination extending downwardly and outwardly from the top of the piston and registering with the inlet port in the cylinder at the bottom of the combustion chamber, while the two exhaust ports register at the top of the combustion chamber, the cylinder having an aperture vertically above the inlet port in the cylinder, a spark plug in said aperture, the distance from said last mentioned port to said aperture being substantially equal to the length of the stroke of the piston, whereby, at the end of the compression stroke, the spark plug is opposite the outer end of the inlet port in the piston-sleeve combination.

2. A two-cycle engine comprising a cylinder and cylinder head, a piston therein, said piston having attached thereto a sleeve extending upwardly therefrom, said cylinder having an upstanding extension and said cylinder head having a downward-extending central portion, the space between said extension and said portion having an annular recess adapted slidingly to receive said sleeve, a piston ring in the lower part of said portion below the top of the sleeve at all times, both the cylinder and the piston-sleeve combination having inlet and exhaust ports extending transversely therethrough, the inlet port in the cylinder extending downwardly and outwardly from the top of the piston and registering with the inlet port in the piston-sleeve combination at the bottom of the combustion chamber while the two exhaust ports register at the top of the combustion chamber, the cylinder having an aperture vertically above the inlet port in the cylinder, a spark plug in said aperture, the distance from said last mentioned port to said aperture being substantially equal to the length of the stroke of the piston, whereby, at the end of the compression stroke, the spark plug is opposite the inlet port in the piston-sleeve combination, a piston ring in said combination above the inlet port in the latter and more than the length of the stroke of the piston below the exhaust port in said combination, and a piston ring in said combination below the inlet port in the latter.

3. A two-cycle engine comprising a cylinder, a piston therein, said cylinder and piston having inlet ports arranged to register at the end of the explosion stroke, said cylinder also having an exhaust port adjacent to the top thereof, means for opening and closing said port, the inlet port in the piston extending downwardly and outwardly from the top thereof, the volume of the last-mentioned port below the top of the piston being greater than the volume of the compression space above the top of the piston at the end of the compression stroke, the cylinder having an aperture arranged to register with the outer end of the inlet port in the piston at the end of the compression stroke, and a spark plug in said aperture.

4. A two-cycle engine comprising a closed cylinder, a piston therein, said cylinder and piston having inlet ports arranged to register at the end of the explosion stroke, said cylinder also having an exhaust port adjacent to the top thereof, means for opening and closing said port, the inlet port in the piston located substantially wholly on one side of the piston and extending downwardly and outwardly from the top thereof, the volume of the last mentioned port below the top of the piston being greater than the volume of the compression space above the top of the piston at the end of the compression stroke, the cylinder having an aperture arranged to register with the inlet port in the piston at the end of the compression stroke, and a spark plug in said aperture.

IVAN H. LARSON.